United States Patent
Hayashi et al.

(10) Patent No.: US 8,298,715 B2
(45) Date of Patent: Oct. 30, 2012

(54) CELL LAMINATE AND FUEL CELL PROVIDED WITH THE SAME

(75) Inventors: Tomokazu Hayashi, Seto (JP); Yoshinori Yamamoto, Toyota (JP); Yuichi Yagami, Susono (JP); Jiro Aizaki, Toyota (JP); Junichi Shirahama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 722 days.

(21) Appl. No.: 12/224,373

(22) PCT Filed: Mar. 7, 2007

(86) PCT No.: PCT/JP2007/055006
§ 371 (c)(1),
(2), (4) Date: Aug. 26, 2008

(87) PCT Pub. No.: WO2007/105740
PCT Pub. Date: Sep. 20, 2007

(65) Prior Publication Data
US 2009/0017362 A1    Jan. 15, 2009

(30) Foreign Application Priority Data
Mar. 8, 2006 (JP) .................................. 2006-061960

(51) Int. Cl.
*H01M 2/02* (2006.01)
(52) U.S. Cl. .................... 429/457; 429/518; 429/458
(58) Field of Classification Search .............. 429/457, 429/458, 518
See application file for complete search history.

(56) References Cited

U.S. PATENT DOCUMENTS

| | | | |
|---|---|---|---|
| 2002/0192532 A1 | 12/2002 | Inagaki et al. | |
| 2005/0186464 A1 | 8/2005 | Sugiura et al. | |

FOREIGN PATENT DOCUMENTS

| | | | |
|---|---|---|---|
| JP | 3-109266 | | 11/1991 |
| JP | 6-267559 | A | 9/1994 |
| JP | 8-180883 | A | 7/1996 |
| JP | 2002-305006 | A | 10/2002 |
| JP | 2003-77499 | A | 3/2003 |
| JP | 2004-165125 | A | 6/2004 |
| JP | 2004-186139 | A | 7/2004 |
| JP | P3608741 | | 10/2004 |
| JP | 2005-100697 | A | 4/2005 |
| JP | 2005-116404 | A | 4/2005 |
| JP | 2005-317311 | A | 11/2005 |
| JP | 2006-252803 | A | 9/2006 |
| WO | WO 01/59864 | A1 | 8/2001 |
| WO | WO 2007/126032 | A1 | 11/2007 |

*Primary Examiner* — Jane Rhee
(74) *Attorney, Agent, or Firm* — Kenyon & Kenyon LLP

(57) ABSTRACT

There is realized a structure particularly suitable for inhibiting deformation of separators having a structure where the shapes of projections and recesses are inverted from each other on the front side and the back side of each separator as in a pressed metal separator. Between adjacent separators, there is formed either a power generation region where MEAs and frame members for holding at least a part of the MEAs are inserted or a refrigerant flow region where neither the MEAs nor the frame members are inserted. A deformation inhibiting region for inhibiting deformation of each separator is formed by a projection provided on the separator. Also, a projection for inhibiting the separator from deforming at the deformation inhibiting region or nearby is formed on each frame member. The projection is projected toward the back side of the deformation inhibiting region, where the deformation inhibiting region is a recess on the back side of the separator.

8 Claims, 7 Drawing Sheets

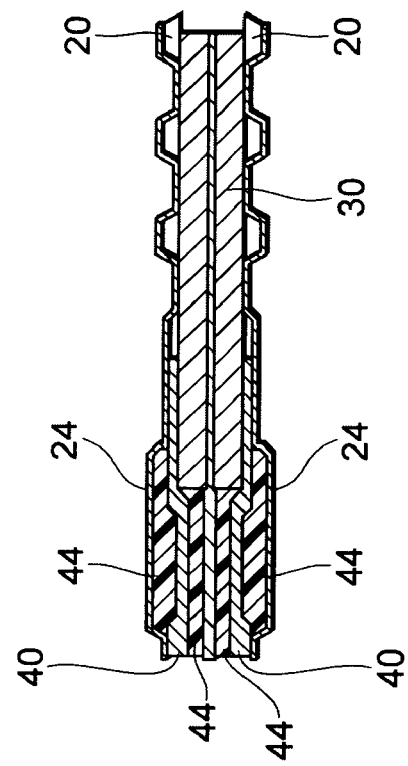
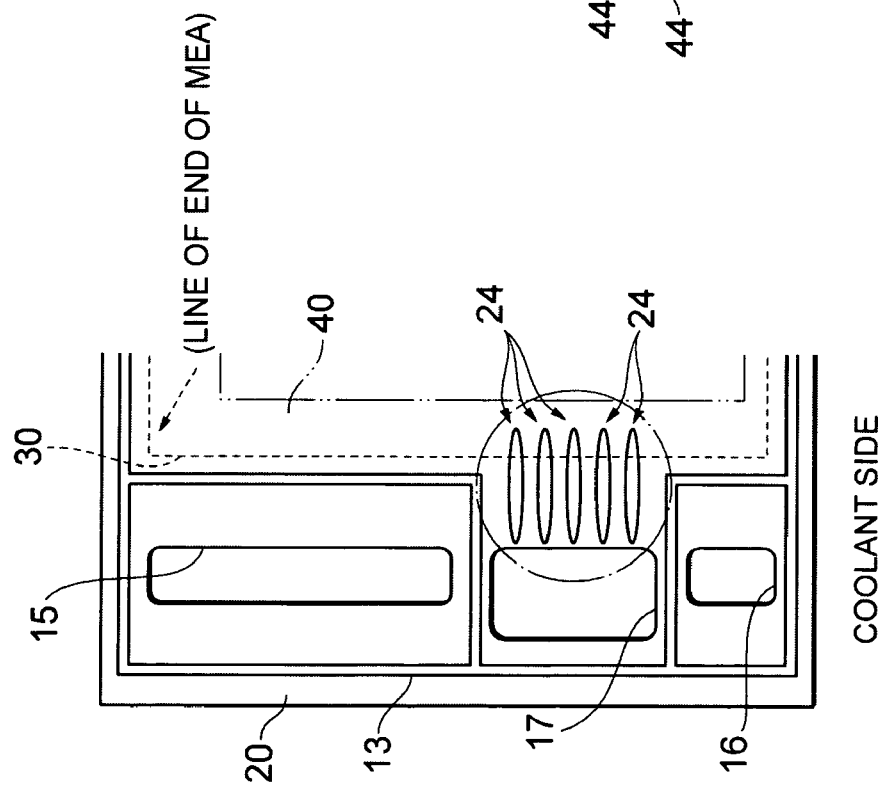

CELL LAMINATE AND FUEL CELL PROVIDED WITH THE SAME

This is a 371 national phase application of PCT/JP2007/055006 filed 7 Mar. 2007, which claims priority to Japanese Patent Application No. 2006-061960 filed 8 Mar. 2006, the contents of which are incorporated herein by reference.

BACKGROUND OF THE INVENTION

1. Field of the Invention

The present invention relates to a cell laminate and a fuel cell provided with this laminate. More particularly, the present invention relates to the improvement of a structure such as a separator constituting a cell laminate.

2. Description of Related Art

In general, a fuel cell (e.g., a polymer electrolyte fuel cell) is constituted by laminating a plurality of cells each including an electrolyte held between separators. Moreover, the separators are provided with manifolds for supplying or discharging, to or from the cells, a reactant gas (a fuel gas, an oxidizing gas) or a refrigerant for cooling.

Heretofore, as such a separator, a carbon separator or a metal separator has often been used. In a case where the shapes of projections and recesses are formed independently of each other on the front side and backside of, for example, the carbon separator, ribs for backup are sometimes provided on portions which connect the manifolds for various fluids to a power generation region (a region where the fuel gas reacts with the oxidizing gas to generate a power). These ribs function as spacers interposed between the adjacent separators to back up (or support) the separators, whereby the deformation of the separators is inhibited (e.g., see Patent Document 1).

[Patent Document 1] Japanese Patent No. 3608741

SUMMARY OF THE INVENTION

However, in the actual situation, there has sufficiently not been investigated a backup structure capable of effectively inhibiting the deformation of a separator having a structure where the shapes of projections and recesses are inverted from each other on the front surface and the back surface of the separator as seen in, for example, a pressed metal separator.

To solve the problem, an object of the present invention is to provide a cell laminate having a structure particularly suitable for inhibiting the deformation of a separator having a structure where the shapes of projections and recesses are inverted from each other on the front surface and the back surface of the separator as in a pressed metal separator, and to provide a fuel cell provided with this laminate.

To achieve such objects, the present inventors have variously performed investigation. To laminate the separators having such a structure that the shapes of the projections and the recesses are inverted from each other on the front surface and the back surface of each separator as in the pressed metal separator, the projections of the adjacent separators are arranged so as to face each other, and the recesses of the adjacent separators are arranged so as to face each other, whereby a space for fluid circulation is formed in many cases. The present inventors have noted such characteristics of the laminate, and have found a technology capable of solving the above problem.

The present invention is developed based on such finding, and there is provided a cell laminate in which separators each holding a membrane-electrode assembly therebetween are laminated, wherein between adjacent separators, there is formed either a power generation region where the membrane-electrode assembly and a frame-like member which holds at least a part of this membrane-electrode assembly are inserted or a refrigerant flow region where the membrane-electrode assembly or the frame-like member is not inserted. A deformation inhibiting region which inhibits the deformation of the separator is formed of projections provided on portions of the separator which connect manifolds to supply or discharge a reactant gas or a refrigerant to or from cells to the power generation region of the membrane-electrode assembly. Another deformation inhibiting region which inhibits the deformation of the separator in the power generation region where the frame-like member is inserted is formed of projections provided on the frame-like member.

In the cell laminate, the above-mentioned power generation region and refrigerant flow region are, for example, alternately formed. In the present invention, in the refrigerant flow region of such a cell laminate, that is, the region where either the membrane-electrode assembly or the frame-like member is not inserted and where the refrigerant for cooling flows, such projections as to protrude toward the refrigerant flow region are provided to form the deformation inhibiting region. Such a deformation inhibiting region functions as, for example, ribs to improve the rigidity of the separator. Alternatively, the deformation inhibiting region comes in contact with the deformation inhibiting region of the adjacent separator so that the deformation inhibiting regions back up (support) each other. In consequence, the deformation of the separator can effectively be inhibited.

Moreover, the deformation inhibiting region formed in the refrigerant flow region of the separator as described above is constituted of, for example, a plurality of projections or the like, whereby a function of dispersing the refrigerant for cooling can be performed. Therefore, the refrigerant can be spread over the refrigerant flow region to completely flow through the region.

In addition, as described above, the other deformation inhibiting region for inhibiting the deformation of the separator is formed of the projections provided on the frame-like member, whereby the projections function so as to support the separator from the side of the power generation region, thereby inhibiting the deformation of the separator. As a result, the deformation of the separator can be inhibited from both the power generation region and the refrigerant flow region.

Furthermore, it is preferable that the refrigerant flow region where the frame-like member is not inserted is provided with frame-like ribs which are constituted of projection-like portions provided on the separator so as to have a height equal to that of the projections and which make a space between the groove bottom surfaces of the separators facing each other via the projection-like portions. The frame-like ribs are allowed to directly abut on, for example, the frame-like ribs of the adjacent separator, and can function as a spacer which forms a predetermined space (e.g., a passage for refrigerant circulation) between these separators.

Moreover, in the cell laminate, it is further preferable that frame-like member is provided with separator deformation inhibiting projections which project toward the recessed back surface of the deformation inhibiting region formed on the separator to suppress the deformation of the separator at the deformation inhibiting region or nearby. In consequence, when, for example, an adhesive is interposed between the separator and the frame-like member, the thickness (projection amount) of an adhesive layer (the layer constituted of an adhesive) can be decreased as much as the thickness (projection amount) of the projections for inhibiting the separator deformation. If the rigidity of the frame-like member is higher than that of the adhesive layer, the rigidity of the portion for backing up the back surface of the deformation inhibiting region can be increased to suppress the deformation of the corresponding portion or nearby.

Furthermore, according to the present invention, there is provided a cell laminate in which separators each holding a membrane-electrode assembly therebetween are laminated, wherein between adjacent separators, there is formed either a power generation region where the membrane-electrode assembly and a frame-like member which holds at least a part of this membrane-electrode assembly are inserted or a refrigerant flow region where the membrane-electrode assembly or the frame-like member is not inserted. A deformation inhibiting region which inhibits the deformation of the separator is formed of projections provided on portions of the separator which connect manifolds to supply or discharge a reactant gas or a refrigerant to or from cells to the power generation region of the membrane-electrode assembly. At least a part of the deformation inhibiting region overlaps with the membrane-electrode assembly as viewed from a separator laminating direction. The overlapped portion can be pressed using a reaction force generated owing to the resilient force or elastic force of the membrane-electrode assembly, so that there is an advantage that the generation of a gap between the portion and the adjacent cell is further easily inhibited.

Moreover, in the cell laminate, it is also preferable that the deformation inhibiting regions formed on the separators disposed adjacent to each other across the refrigerant flow region come in contact with each other. The deformation inhibiting regions come in contact with each other, whereby while maintaining a state in which the separators come in close contact with each other, the separators can be prevented from being deformed.

Furthermore, a fuel cell according to the present invention includes the above-mentioned cell laminate.

BRIEF DESCRIPTION OF THE DRAWINGS

FIG. 2A shows a structure around a manifold as viewed from the side of a coolant passage, as the structure example of the separator constituting the cell laminate;

FIG. 2B shows the sectional structure of a portion surrounded with a one-dot chain line circle in FIG. 2A;

DETAILED DESCRIPTION OF PREFERRED EMBODIMENT

Figure 1:
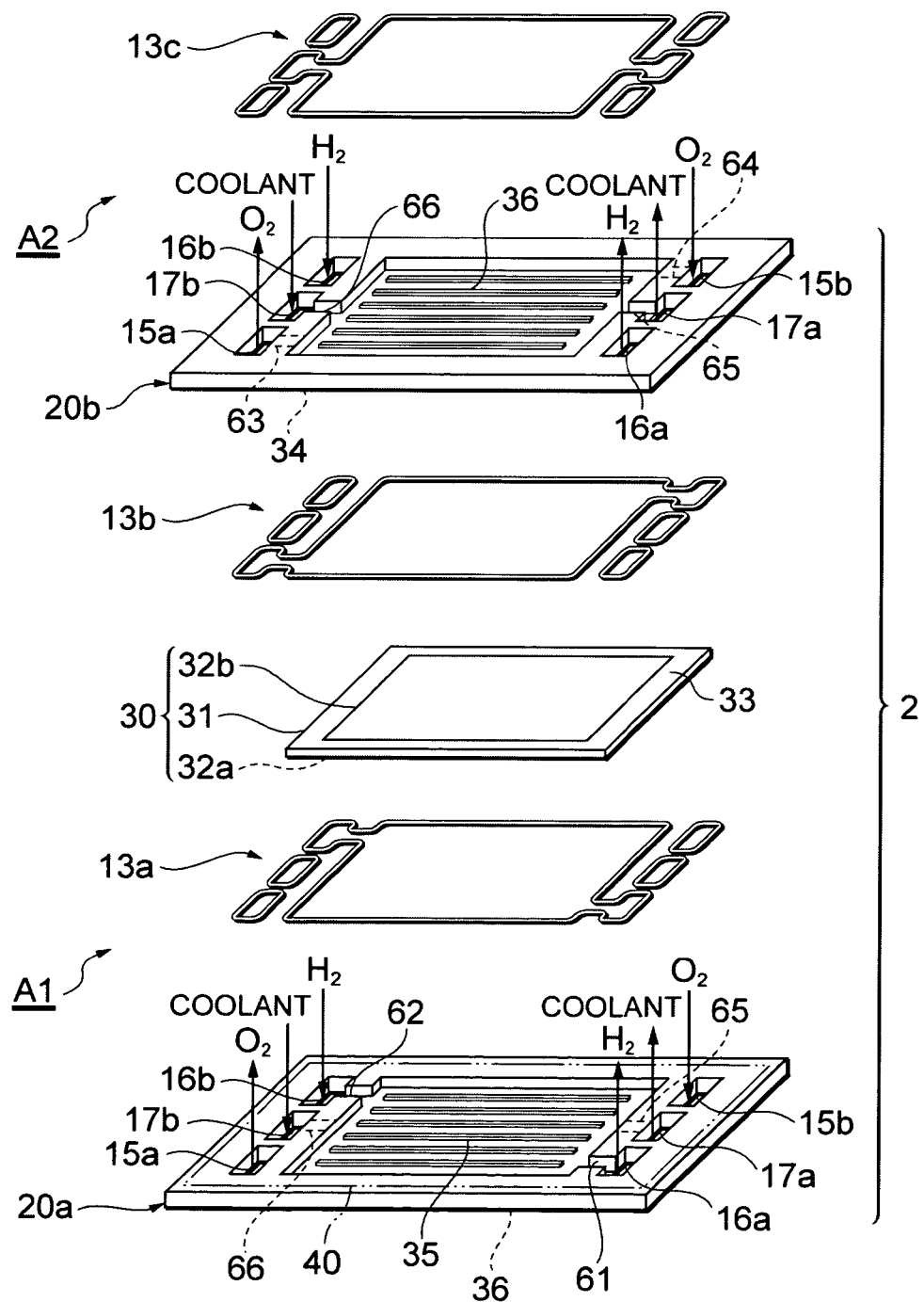
FIG. 1 is an exploded perspective view showing one embodiment of the present invention, and shows the exploded cell of the separator of a cell laminate in the present embodiment.

Hereinafter, suitable embodiments of the present invention will be described with reference to the drawings.

FIGS. 1 to 7 show a cell laminate 3 and a fuel cell 1 having the same according to the present invention. The cell laminate 3 in each of the embodiments is made by laminating a plurality of separators 20 or plural pairs of separators 20 between which a membrane-electrode assembly 30 is disposed (in FIG. 1, the two separators constituting the cell are shown by reference numerals 20a, 20b). In the present embodiment, one of a power generation region and a refrigerant flow region is formed between the adjacent separators 20 of the cell laminate 3, and to inhibit the deformation of the separators 20, a deformation inhibiting region is further formed therebetween.

In the embodiment which will hereinafter be described, the schematic constitution of a cell 2 constituting the fuel cell 1 will first be described, and then constitutions of the deformation inhibiting region provided as mentioned above and the like will be described.

FIG. 1 shows a schematic constitution of the cell 2 of the fuel cell 1 in the present embodiment. The cells 2 constituted as shown in the drawing are successively laminated to form the cell laminate (stack) 3. The thus formed cell laminate (stack) 3 is held at both the ends thereof by, for example, support plates (not shown), and a tension plate (not shown) is arranged so as to connect the opposite support plates with each other. In this state, a load is applied thereto in a laminating direction to fasten the stack.

The fuel cell 1 constituted of the cell laminate (stack) 3 in which the cells 2 are laminated is applicable to, for example, an in-vehicle power generation system of a fuel cell hybrid vehicle (FCHV), but this is not restrictive. The fuel cell 1 is applicable to generation systems carried on various kinds of movable bodies (e.g., ships and airplanes) and robots which are self-movable, and stationary types of fuel cell systems.

The cell 2 is constituted of an electrolyte, i.e., a membrane-electrode assembly 30 [hereinafter referred to as the MEA (a membrane electrode assembly)] as a typical example, and a pair of separators 20 (which are shown by reference numerals 20a, 20b in FIG. 1) which sandwich the MEA 30 (see FIG. 1). The MEA 30 and the respective separators 20a and 20b are formed into a shape of a substantially rectangular plate. Furthermore, the MEA 30 is formed so that its outer shape is a size smaller than that of the respective separators 20a, 20b.

The MEA 30 is constituted of a polymeric electrolyte membrane (hereinafter referred to also simply as the electrolyte membrane) 31 constituted of an ion exchange membrane of a polymeric material, and a pair of electrodes 32a, 32b (an anode and a cathode) which sandwich the electrolyte membrane 31 from both the surfaces thereof (see FIG. 1). The electrolyte membrane 31 of them is formed so as to be slightly larger than the respective electrodes 32a, 32b. To the electrolyte membrane 31, the respective electrodes 32a, 32b are joined by, for example, hot pressing, a peripheral portion 33 of the electrolyte membrane 31 being left.

The electrodes 32a, 32b which constitute the MEA 30 are made of, for example, a porous carbon material (a diffusion layer) having a surface on which a catalyst such as platinum is carried. To the anode 32a, a hydrogen gas as a fuel gas (a reactant gas) is fed, and to the cathode 32b, an oxidizing gas (a reactant gas) such as air or an oxidizing agent is fed. These two kinds of reactant gases electrochemically react in the MEA 30 to obtain the electromotive force of the cell 2.

The separators 20a, 20b are made of a gas-impermeable conductive material. Examples of the conductive material include carbon, conductive hard resins, and metals such as aluminum and stainless steel. In the present embodiment, the separators 20a, 20b are made of a plate-like metal (metal separators), and on the surfaces of the electrodes 32a, 32b of this material, membranes having excellent corrosion resistance (e.g., membranes made by gold plating) are formed.

Moreover, on both the surfaces of the separators 20a, 20b, passages of grooves which are plural recesses are formed. In a case where the separators 20a, 20b in the present embodiment are made of, for example, the plate-like metal material, the passages can be formed by press molding. The thus formed grooves-like passages constitute gas passages 34 of an oxidizing gas, gas passages 35 of a hydrogen gas, or coolant passages 36. More specifically, on the inner surface of the separator 20a on the side of the electrode 32a, the plurality of hydrogen gas passages 35 are formed, and on the back surface (the outer surface) of the separator 20a, the plurality of coolant passages 36 are formed (see FIG. 1). Similarly, on the inner surface of the separator 20b on the side of the electrode 32b, the plurality of oxidizing gas passages 34 are formed, and on the back surface (the outer surface) of the separator 20b, the plurality of coolant passages 36 are formed (see FIG. 1). For example, in the case of the present embodiment, the gas passages 34 and the gas passages 35 in the cell 2 are formed so that they are parallel with each other. Furthermore, in the present embodiment, the coolant passages 36 of the separators 20a, 20b in the two adjacent cells 2, 2 are configured to form passages having a section such as a rectangular shape or a honeycombed shape when the outer surface of the separator 20a of the one cell 2 is joined to the outer surface of the separator 20b of the adjacent other cell 2 (see FIG. 1).

Furthermore, as described above, in the respective separators 20a, 20b, the shapes of projections and recesses constituting at least a fluid passage are inverted from each other on the front surface and the back surface of each separator. More specifically, in the separator 20a, the back surfaces of projection shapes (projection ribs) forming the gas passages 35 of the hydrogen gas have recessed shapes (recessed grooves) forming the coolant passages 36, and the back surfaces of the recessed shapes (the recessed grooves) forming the gas passage 35 have projection shapes (projection ribs) forming the coolant passages 36. Furthermore, in the separator 20b, the back surfaces of projection shapes (projection ribs) forming the gas passages 34 of the oxidizing gas have recessed shapes (recessed grooves) forming the coolant passages 36, and the back surfaces of the recessed shapes (the recessed grooves) forming the gas passages 34 have projection shapes (projection ribs) forming the coolant passages 36.

Moreover, around the ends of the separators 20a, 20b in a longitudinal direction (in the vicinity of one end shown on the left side as one faces FIG. 1 according to the present embodiment), there are formed manifolds 15a on the inlet side of the oxidizing gas, manifolds 16b on the outlet side of the hydrogen gas and manifolds 17b on the outlet side of the coolant. For example, in the present embodiment, these manifolds 15a, 16b and 17b are formed of substantially rectangular or trapezoidal through holes provided in the respective separators 20a, 20b (see FIG. 1). Furthermore, the opposite ends of the separators 20a, 20b are provided with manifolds 15b on the outlet side of the oxidizing gas, manifolds 16a on the inlet side of the hydrogen gas and manifolds 17a on the inlet side of the coolant. In the present embodiment, these manifolds 15b, 16a and 17a are also formed of substantially rectangular or trapezoidal through holes (see FIG. 1).

Among the above manifolds, the inlet-side manifold 16a and the outlet-side manifold 16b for the hydrogen gas in the separator 20a communicate with the gas passages 35 of the hydrogen gas via an inlet-side communication passage 61 and an outlet-side communication passage 62 as grooves formed in the separator 20a. Similarly, the inlet-side manifold 15a and the outlet-side manifold 15b for the oxidizing gas in the separator 20b communicate with the gas passages 34 of the oxidizing gas via an inlet-side communication passage 63 and an outlet-side communication passage 64 as grooves formed in the separator 20b (see FIG. 1). Furthermore, the inlet-side manifolds 17a and the outlet-side manifolds 17b for the coolant in the respective separators 20a, 20b communicate with the coolant passages 36 via inlet-side communication passages 65 and outlet-side communication passages 66 as grooves formed in the respective separators 20a, 20b. According to the above-mentioned constitution of the respective separators 20a, 20b, the oxidizing gas, the hydrogen gas and the coolant are fed to the cell 2. Here, as a typical example, in a case where the cells 2 are laminated, for example, the hydrogen gas passes through the communication passage 61 from the inlet-side manifold 16a of the separator 20a to flow into the gas passages 35, and is used for the power generation of the MEA 30. Afterward, the gas passes through the communication passage 62, and is discharged to the outlet-side manifold 16b.

Both a first seal member 13a and a second seal member 13b are formed of a plurality of members (e.g., four small rectangular frame members and a large frame member for forming fluid passages) (see FIG. 1). The first seal member 13a of them is provided between the MEA 30 and the separator 20a. More specifically, the first seal member is provided so that a part of the member is interposed between the peripheral portion 33 of the electrolyte membrane 31 and a portion of the separator 20a around the gas passages 35. Moreover, the second seal member 13b is provided between the MEA 30 and the separator 20b. More specifically, the second seal member is provided so that a part of the member is interposed between the peripheral portion 33 of the electrolyte membrane 31 and a portion of the separator 20b around the gas passages 34.

Furthermore, a third seal member 13c formed of a plurality of members (e.g., four small rectangular frame members and a large frame member for forming a fluid passage) is provided between the separator 20b and the separator 20a of the adjacent cells 2, 2 (see FIG. 1). This third seal member 13c is a member interposed between a portion of the separator 20b around the coolant passages 36 and a portion of the separator 20a around the coolant passages 36 to seal between these portions.

It is to be noted that as the first to third seal members 13a to 13c, an elastic member (a gasket) which physically comes in close contact with an adjacent member to seal the portion with a fluid, an adhesive which is chemically connected and bonded to the adjacent member or the like may be used. The above frame-like member described later in detail is a material which is not easily (elastically) deformed against an external force as compared with the first to third seal members 13a to 13c. In this respect, the frame-like member is advantageously operated as compared with the first to third seal members 13a to 13c as a deformation inhibiting region.

Next, the constitution of the deformation inhibiting region and the like provided on the cell laminate 3 will be described (see FIG. 2A, etc.).

Here, in the cell 2 having the above constitution, a region which is at least a part of a region sandwiched between the separator 20a and the separator 20b and in which the MEA 30 and the frame-like member are inserted is a region in which the hydrogen gas chemically reacts with the oxidizing gas to generate electricity (referred to as a power generation region in the present description and denoted with symbol A1 in FIG. 1). Moreover, the region is a region held between the separators 20 and 20 of the adjacent cells 2 (e.g., a region held between the separator 20b shown in FIG. 1 and a separator (not shown) adjacent to this separator 20b via the third seal member 13c), that is, a region (referred to as a refrigerant flow region in the present description and denoted with symbol A2 in FIG. 1) in which either the MEA 30 or the frame-like member is not inserted and in which the coolant passages 36 for circulating the coolant is formed.

Figure 3:
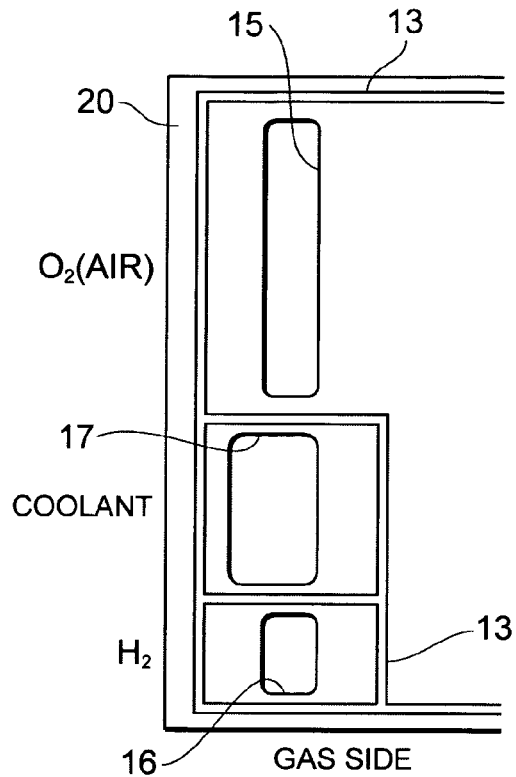
FIG. 3 is a diagram showing the structure example of the separator constituting the cell laminate, and shows a structure around the manifold as viewed from the side of an oxidizing gas (AIR) passage surface.
Figure 4:
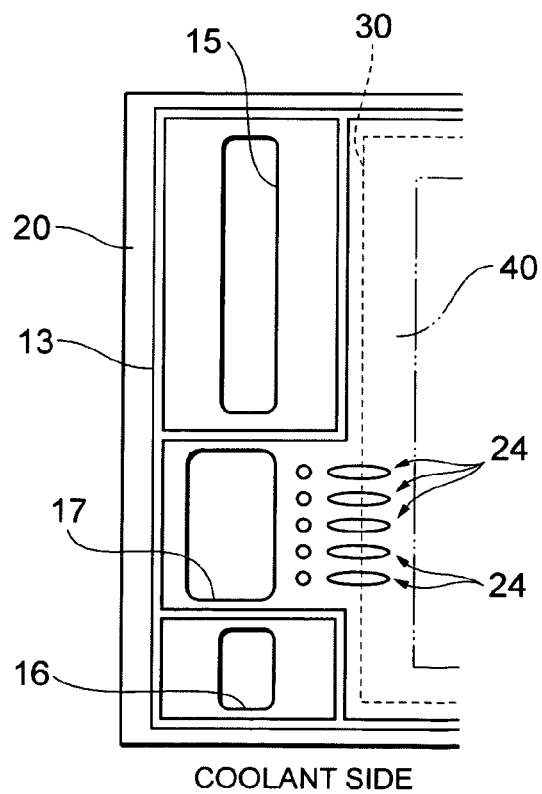
FIG. 4 is a diagram showing another shape example of a deformation inhibiting region.
Figure 5:
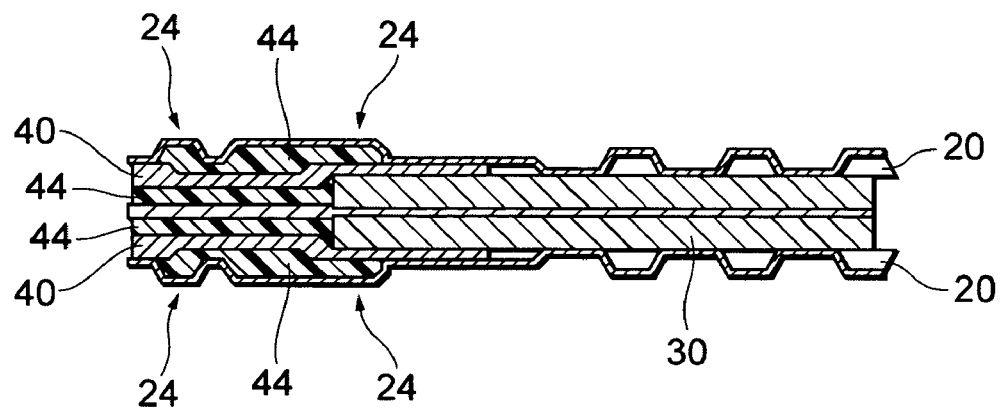
FIG. 5 is a diagram showing a sectional structure around the deformation inhibiting region shown in FIG. 4.

Moreover, the above frame-like member is a member which is inserted together with the MEA 30 in the power generation region A1 and which holds at least a part of this MEA 30. For example, in the present embodiment, a frame made of a resin and having a thin frame shape is interposed in this power generation region A1, and is allowed to function as a frame-like member 40 (see FIGS. 2A, 2B). In this case, the frame-like member 40 is provided so as to hold at least a part of the MEA 30, for example, a portion disposed along the peripheral portion 33 from the front side and the backside (see FIGS. 2A, 2B with the proviso that FIGS. 2A and 3 schematically show an only edge shape close to the MEA 30).

Furthermore, this cell laminate 3 is provided with a deformation inhibiting region for inhibiting the deformation of the separator 20. For example, in the present embodiment, projections projected toward the refrigerant flow region A2 are provided on the separator 20, whereby these projections form a deformation inhibiting region 24 (see FIGS. 2A, 2B and 3B). The deformation inhibiting region 24 formed in this manner functions as so-called backup to support the separator 20 so that any deformation is not generated.

That is, in case of conventional backup, the thickness of the cell 2 in the corresponding portion might decrease as compared with an electrode portion owing to the deflection of the separator itself, the contraction of the adhesive or the like. In actual, the backup does not or might not come in contact with the adjacent cell 2 (or the separator 20 constituting the cell 2). More specifically, the cell 2 contracts and becomes thin for a reason such as the warp of the separator 20 during assembly or a difference of a linear expansion coefficient between the electrode portion and another portion including the adhesive. As a result, the adjacent cells 2 come away from each other, and the backup sometimes does not perform the original function thereof. Moreover, if an excessively large gas pressure acts in this state, the adhesive in the cell 2 might peel.

On the other hand, in the present embodiment, a member in which such a situation is not easily generated is constituted. That is, the deformation inhibiting region 24 of the present embodiment is constituted of the projections projected toward the refrigerant flow region A2. Moreover, the deformation inhibiting regions 24 formed on the separators 20 disposed adjacent to each other across the refrigerant flow region A2 come in contact with each other. In addition, these deformation inhibiting regions 24 are formed so that at least a part of the deformation inhibiting regions 24 overlaps with the MEA 30 as viewed from a separator 20 (or cell 2) laminating direction (see FIGS. 2A, 2B). That is, for example, in the present embodiment, each deformation inhibiting region 24 is formed in such a continuous shape that the region extends from the vicinity of a coolant manifold 17 to a position beyond the edge of the MEA 30 along a coolant flow direction, so that at least a part of the deformation inhibiting region 24 overlaps with the MEA 30 (see FIGS. 2A, 2B). In this case, the portion of the elongated deformation inhibiting region 24 which overlaps with the MEA 30 can maintain a close contact degree with respect to the adjacent cell 2 (or the separator 20 of the cell) by use of a reaction force (a resilient force or an elastic force) generated by this MEA 30. In addition, the deformation inhibiting region 24 is a projection-like rib formed continuously from the MEA 30 to the manifold 17 without any cut. Therefore, as compared with a constitution in which a plurality of small projection-like portions disposed away from each other between the MEA 30 and the manifold 17 are employed as the deformation inhibiting region, deflection can be suppressed, and the reaction force generated by the MEA 30 can suitably be transmitted to the manifold 17. Therefore, in the cell laminate 3 of the present embodiment in which these deformation inhibiting regions 24 function as the backup, it can easily be prevented that a gap is made between the deformation inhibiting region and the adjacent cell 2 during cell lamination.

Furthermore, the deformation inhibiting region 24 is partially or entirely formed of projections provided on portions which connect the power generation region A1 above the MEA 30 to the outside of the power generation region A1 (the outside of a region provided with a catalyst), that is, the manifolds 15 to 17 for supplying or discharging the reactant gas or the refrigerant to or from the respective cells (see FIGS. 2A, 2B, etc.).

It is to be noted that as described above, the deformation inhibiting region 24 of the present embodiment has such a shape that the region continuously extends in the flow direction of the coolant, but there is not any special restriction on the specific shape. Elliptic projections may be used, or the projections may have an oblong shape similar to a track shape. Alternatively, as shown in FIGS. 2A, 2B, a shape having both tapered ends (a horizontally elongated circular shape) may be used. Moreover, FIGS. 2A, 2B show an example in which a plurality of projections are arranged, but these projections may be arranged so as to broaden toward the ends thereof as the case may be. In any case, a backup structure itself constituted of the deformation inhibiting region 24 is formed into an elongated shape which continues to the backup section overlapped with the MEA 30, whereby while the rigidity of the separator 20 is improved, it can be prevented that a gap is made between the separator and the adjacent cell 2 during the cell lamination.

Moreover, the deformation inhibiting regions 24 constituted of the above-mentioned projections according to the present embodiment are arranged in the vicinity of the coolant manifold (simply denoted with reference numeral 17 in FIG. 2A, etc.) on the inlet and outlet sides (see FIG. 2A). These deformation inhibiting regions 24 are constituted of a plurality of projections, so that the coolant can equally be distributed to the coolant passages 36. Moreover, from a viewpoint that the coolant is more equally distributed and spread over the plane of the separator 20, the projections having the same shape and an equal size are preferably arranged at equal intervals as shown in FIG. 2A. The projections may be arranged not only in parallel as described above but also so as to broaden toward the ends thereof. In addition, when the coolant can equally be spread in the separator plane as described above, burdens imposed on the separator 20, the seal member (e.g., the third seal member 13c) and the like are decreased, and eventually durability is improved.

In addition, it has been described above that the backup structure constituted of the deformation inhibiting regions 24 itself has the elongated shape, and has the shape continued to the backup sections which overlap with the MEA 30, but this is merely a preferable configuration. This is not restrictive to a case where each of the deformation inhibiting regions 24 does not have a shape continuous from one end thereof to the other end. That is, according to another example, the deformation inhibiting region 24 may be constituted of a plurality of separated projections such as dotted projections or linear projections (see FIGS. 3, 5). In short, even if the deformation inhibiting region 24 is formed of divided projections, the rigidity of the separator 20 can be improved owing to the deformation inhibiting region 24. Moreover, at least a part of the deformation inhibiting region 24 overlaps with the MEA 30, and functions as the backup. In this structure, it can be prevented that the gap is generated between the deformation inhibiting region and the adjacent cell 2 during the cell lamination.

Here, the cell laminate 3 constituted of the above-mentioned cells 2, and the fuel cell 1 including the cell laminate 3 will be described (see FIGS. 6, 7).

Figure 6:
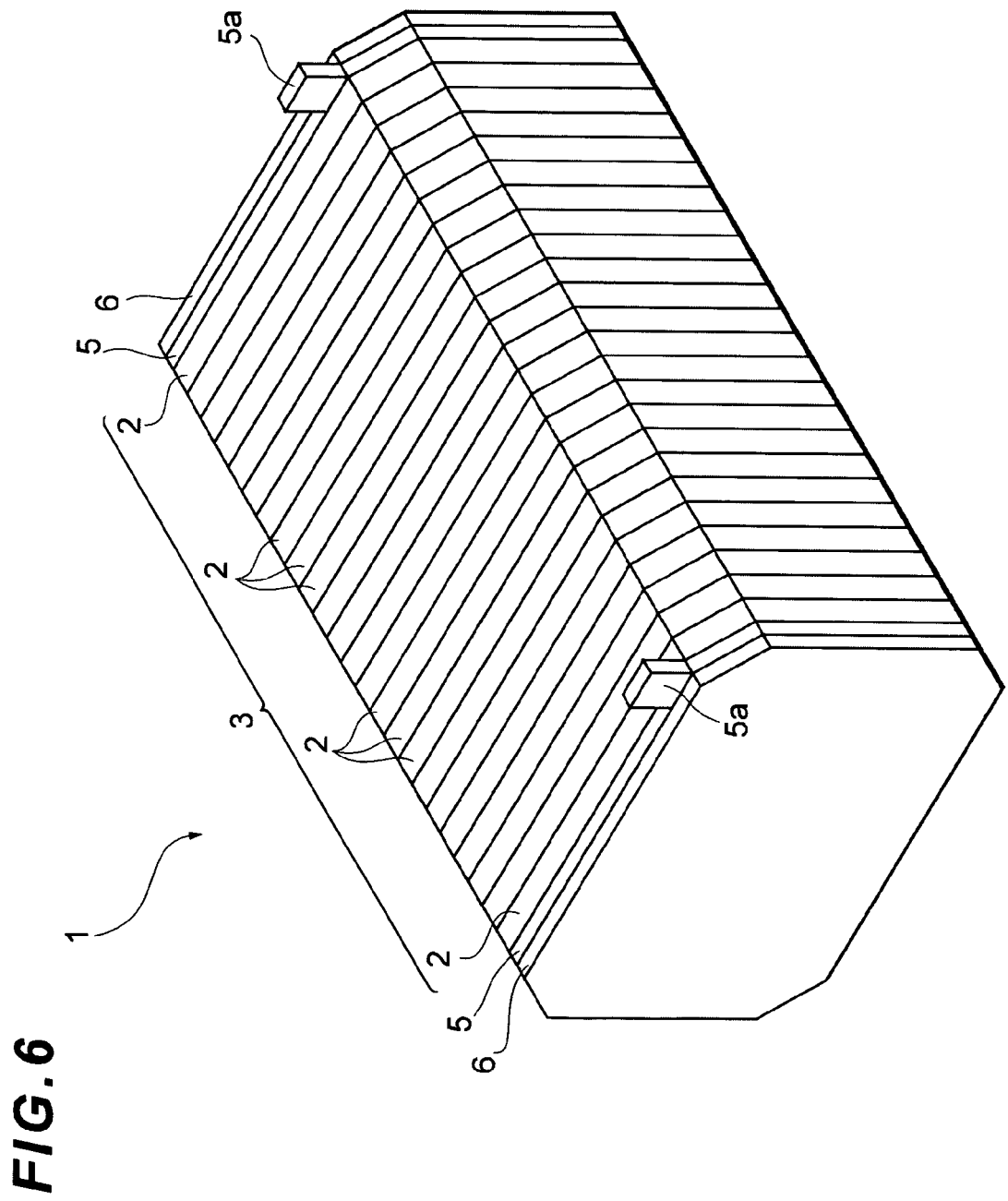
FIG. 6 is a perspective view showing the cell laminate or the like constituting a fuel cell.
Figure 7:
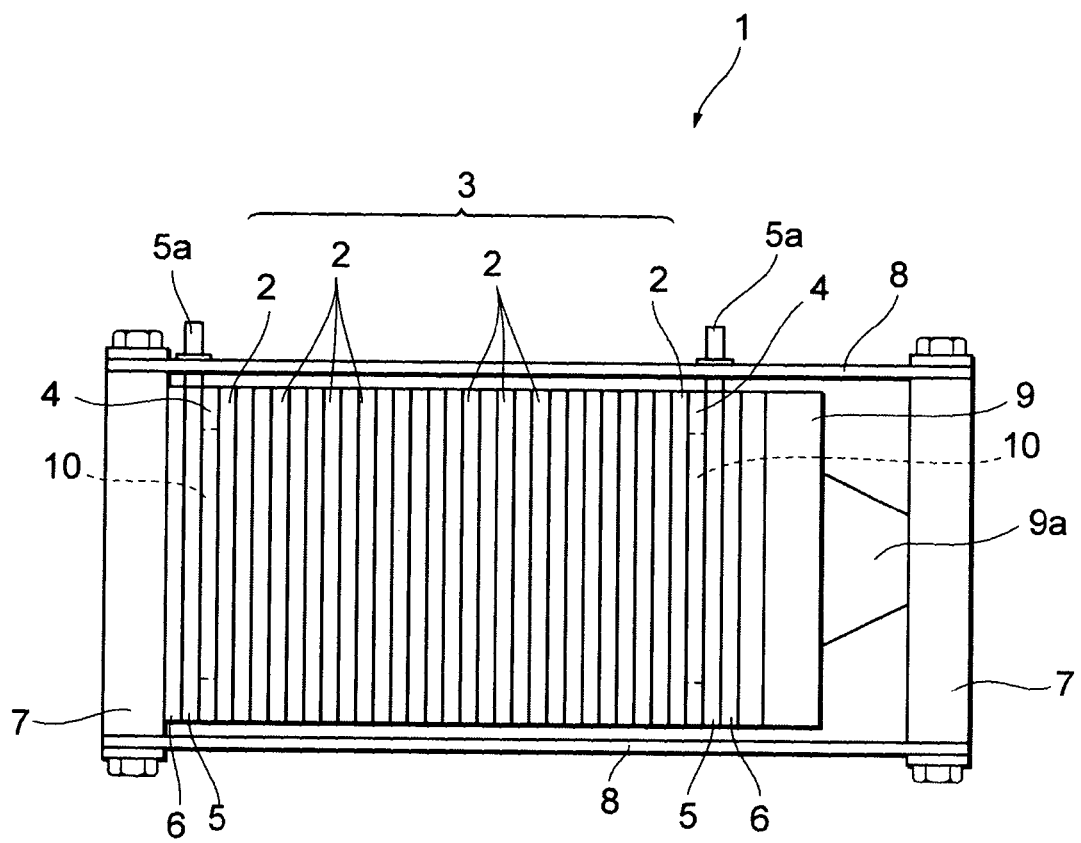
FIG. 7 is a side view showing the structure example of a fuel cell.

The fuel cell 1 includes the cell laminate 3 in which a plurality of cells 2 are laminated, and externally from the laminating direction of the end cells 2 positioned at both the ends of the cell laminate 3, insulation cells 4, terminal plates 5 provided with output terminals 5*a*, insulators (insulation plates) 6 and end plates 7 are further arranged (see FIGS. 6, 7). A predetermined compressive force is applied to the cell laminate 3 in the laminating direction by a tension plate 8 extended so as to connect the end plates 7 to each other. Furthermore, a pressure plate 9 and a spring mechanism 9*a* are arranged between the end plate 7 and the insulator 6 on the side of one end of the cell laminate 3, whereby the fluctuations of loads applied to the cells 2 are absorbed.

Each insulation cell 4 is provided with an insulation layer including, for example, two separators 20 and the seal members (e.g., the first seal member 13*a*, the second seal member 13*b*), and performs a function of inhibiting heat generated owing to power generation from being radiated to the atmosphere or the like. That is, in general, the temperature of each end of the cell laminate 3 easily lowers owing to heat exchange performed between the cell laminate and the atmosphere. To solve the problem, the insulation layers are formed on the ends of the cell laminate 3 to inhibit the heat exchange (heat radiation). Such an insulation layer has a constitution in which instead of the membrane-electrode assembly, an insulation member 10 such as a conductive plate is sandwiched between a pair of separators 20 similar to those provided in the cell 2. The insulation member 10 for use in this case preferably has an excellent insulation property, and as a typical example, a conductive porous sheet or the like is used.

The terminal plate 5 is a member which functions as a current collector plate, and the plate is formed of a plate-like metal such as iron, stainless steel, copper or aluminum. The surface of the terminal plate 5 on the side of the insulation cell 4 is subjected to a surface treatment such as a plating treatment, and a contact resistance with respect to the insulation cell 4 is secured owing to such a surface treatment. Examples of plating include gold, silver, aluminum, nickel, zinc and tin. In the present embodiment, for example, a tin plating treatment is performed in view of conductivity, processability and inexpensiveness.

The insulator 6 is a member which performs a function of electrically insulating the terminal plate 5 and the end plate 7. To perform such a function, such an insulator is formed of a plate-like resin material such as polycarbonate.

The end plate 7 is formed into a plate shape of any type of metal (iron, stainless steel, copper, aluminum or the like) in the same manner as in the terminal plate 5. For example, in the present embodiment, this end plate 7 is formed using copper, but this is merely one example, and the plate may be formed of another metal.

Next, another embodiment of the present invention will be described with reference to FIGS. 8 and 9.

Figure 8:
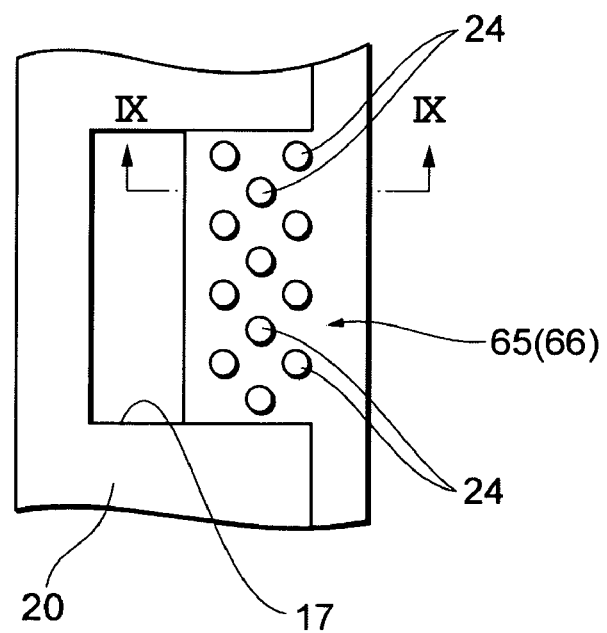
FIG. 8 is a diagram showing another embodiment of the present invention, and is a partially plan view showing a structure example of and around a manifold for coolant.
Figure 9:
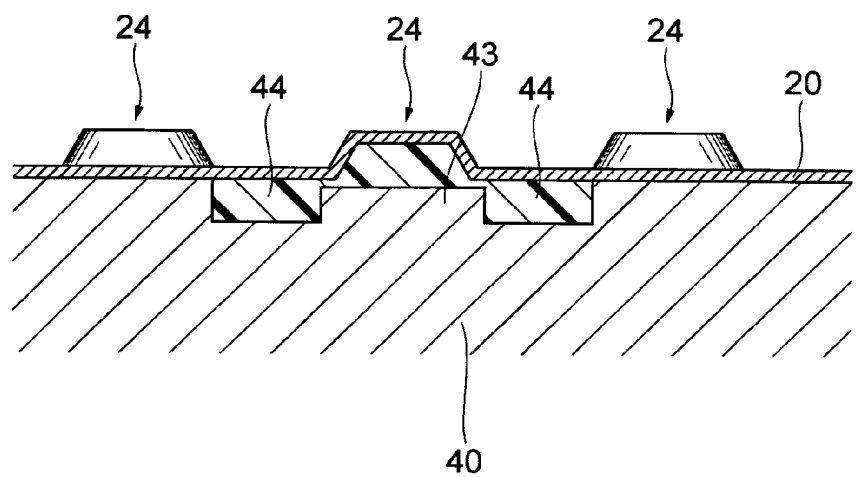
FIG. 9 is a sectional view cut along the IX-IX line of FIG. 8.

Here, a plurality of protruded projections are provided in positions close to the coolant manifolds 17 on the inlet and outlet sides, more specifically coolant communication passages 65, 66, and the coolant flowing through coolant passages 36 can equally be distributed by these projections (see FIG. 8). Here, as shown in FIG. 8, three rows of projections are arranged at equal intervals in a state in which the only middle row of projections is staggered as much as a half pitch, but this is merely one example of a preferable configuration. Arrangement intervals may eccentrically be set, or the size of each projection may be varied.

Moreover, in the present embodiment, the projections formed on the separator 20 in this manner are allowed to function as the deformation inhibiting region 24 for inhibiting the deformation of the separator 20. That is, the deformation inhibiting regions 24 similarly constituted of the projections are also provided in the opposite positions of the adjacent separators 20, and the separators 20 are superimposed on each other in a state in which these deformation inhibiting regions 24 are brought into contact with each other. In this case, the deformation inhibiting regions 24 formed on the separators 20 abut on each other between the adjacent cells 2 and 2 (between the adjacent separators 20 and 20), and the deformation inhibiting regions function as the backup for inhibiting the deformation of the separators 20 when a stack fastening load is applied (see FIGS. 8, 9).

Furthermore, another structure for inhibiting the deformation of the separator 20 is preferably provided. One example will be described. In the power generation region A1 where the above-mentioned frame-like member 40 is inserted, the frame-like member 40 is provided with projections, and the projections may form another deformation inhibiting region 43 for inhibiting the deformation of the separator 20 owing to the projections. The other deformation inhibiting region 43 may directly come in contact with the separator 20 to inhibit the deformation of the separator, or the deformation of the separator 20 may be inhibited in a state in which an adhesive 44 and the like are interposed. Furthermore, in a case where the deformation of the separator 20 is inhibited in a state in which the adhesive 44 and the like are interposed, the adhesive 44 is preferably mixed with small particulate members such as beads having a high rigidity and a small deformable amount as compared with the adhesive 44 and the frame-like member 40.

Moreover, the other deformation inhibiting region 43 formed on the frame-like member 40 as described above may be effective even in a case where recesses are formed on the backside of the deformation inhibiting region 24 by, for example, press processing. A typical example will be described. For example, in the present embodiment, projections for inhibiting the deformation of a separator are provided so as to project toward the back surface of a separator 20 provided with recesses constituting a deformation inhibiting region 24, thereby forming another deformation inhibiting region 43. In consequence, the deformation of the separator 20 at the deformation inhibiting region 24 or nearby is inhibited (see FIG. 9). In the present embodiment, an adhesive layer constituted of an adhesive 44 is interposed between the deformation inhibiting region 24 and the other deformation inhibiting region 43. However, as shown in the drawing, the other deformation inhibiting region 43 is formed, whereby the thickness of the adhesive 44 decreases as much as the thickness (projection amount) of the other deformation inhibiting region 43. For example, when a frame-like member 40 has a rigidity higher than that of the adhesive 44, the rigidity of a portion which backs up the backside of the deformation inhibiting region 24 can be increased to further inhibit the deformation of the corresponding portion or nearby (see FIG. 9).

Furthermore, a modification of the deformation inhibiting region 24 formed on the separator 20 or the other deformation inhibiting region 43 for inhibiting the deformation of the separator 20 in the vicinity of the deformation inhibiting region will hereinafter be described. That is, in addition to a constitution in which a part of the frame-like member 40 is deformed as described above, a constitution may be provided in which spherical members of small particles such as beads having a small strain (a deformation amount at a time when an external force is applied) as compared a seal material (the frame-like member 40) are mixed in at least the corresponding portion of this seal material (the frame-like member 40), whereby the rigidity of the whole constitution can be improved to further inhibit the deformation.

According to the cell laminate 3 and the fuel cell 1 provided with this cell laminate 3 described above, in a case where the separator 20 forming the cell laminate 3 is formed by, for example, press molding and the shapes of projections and recesses are inverted from each other on the front surface and the back surface of the separator, the deformation inhibiting region 24 and further the other deformation inhibiting region 43 can function as the backup. Therefore, when the fastening load is applied to cell laminate 3 having a stack structure, these laminated separators 20 can be inhibited from being deformed. In particular, among a plurality of separators 20, in a region where the frame-like member (e.g., a resin frame) 40 is interposed, the frame-like member 40 is provided with the backup. In a region where any frame-like member 40 is not interposed, the separator 20 itself is provided with the backup. In consequence, in the cell laminate 3 having the stack structure, the deformation of the separator 20 can effectively be inhibited. Furthermore, a fluid such as the coolant can more equally be distributed using the deformation inhibiting region 24.

It is to be noted that the above embodiment is one preferable example of the present invention, but this is not restrictive, and the present invention can variously be modified without departing from the scope of the present invention. For example, in the above embodiment, the adjacent separators 20b, 20c have mainly be described, but this is not restrictive, and needless to say, the respective laminated separators (e.g., the separators 20a, 20d in FIG. 3) may have a similar structure.

Moreover, in the refrigerant flow region A2 where any frame-like member 40 is not inserted, projection-like portions substantially having a height equal to that of the projections forming the deformation inhibiting region 24 or the projections forming the other deformation inhibiting region 43 are provided to form frame-like ribs, whereby a space is preferably made between the groove bottom surfaces of the separators 20 facing each other via the frame-like ribs. This will hereinafter additionally be described.

Figure 10:
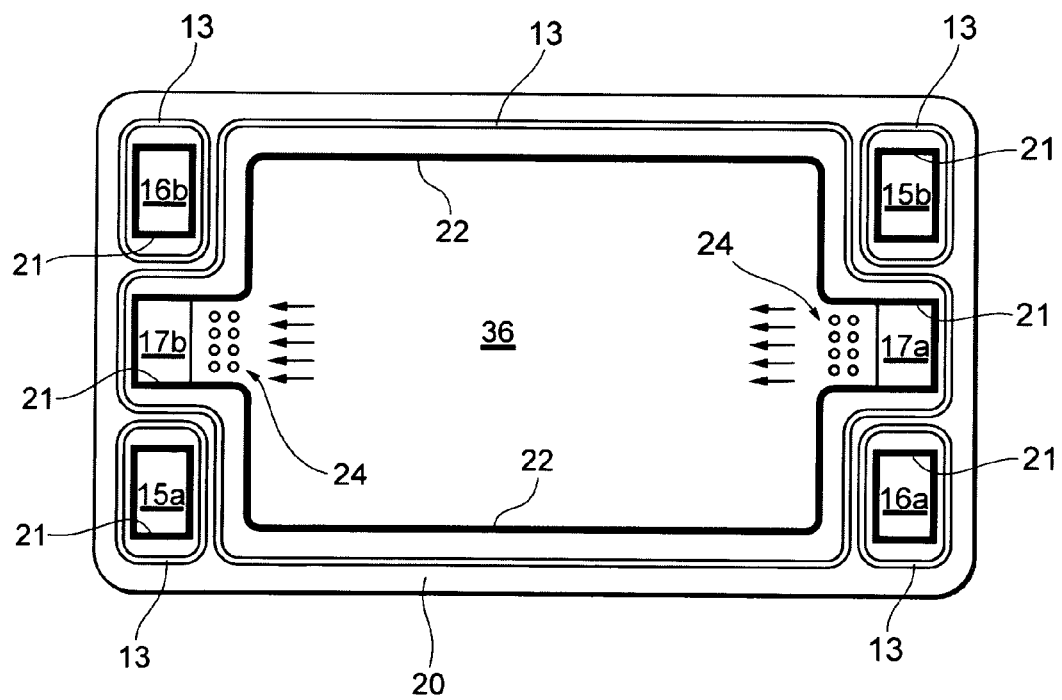
FIG. 10 is a plan view showing the structure of a separator according to still another embodiment of the present invention.

That is, as described above, a separator 20 is provided with manifolds 15a, 15b, 16a, 16b, 17a and 17b for supplying a fluid such as the fuel gas, the oxidizing gas or the cooling refrigerant to cells 2 or discharging the fluid from the cells 2, and the portions of the separator 20 around these manifolds 15a, 15b, 16a, 16b, 17a and 17b are provided with seal members 13, whereby the fluids do not leak from predetermined passages (see FIG. 10). To form these seal members 13 and the manifolds 15a, 15b, 16a, 16b, 17a and 17b, frame-like ribs 21 which protrude in a cell laminating direction are provided between the seal members and manifolds and the edges of holes provided in the separator 20 (see FIG. 10). Moreover, on the outer sides of the seal members 13 (the outer sides mentioned herein are outer peripheral sides, more specifically the sides opposite to the respective manifolds 15a, 15b, 16a, 16b, 17a and 17b), another frame-like rib 22 including projection ribs is formed (see FIG. 10). In addition, the frame-like rib 22 of the present embodiment is formed as a frame-like rib which surrounds the contour of an outer portion of the power generation region A1 provided with a catalyst layer (see FIG. 10). It is to be noted that in FIG. 10 showing the planar structure of the separator 20, to clarify a difference from the seal members 13, these portions provided with the frame-like ribs 21, 22 are shown in bold lines.

To laminate the separators 20 having the above constitution, the inner peripheral frame-like ribs 21 of the separator (e.g., the separator 20b) are allowed to directly abut on the inner peripheral frame-like ribs 21 of another separator (e.g., the separator 20c). Furthermore, the outer peripheral frame-like ribs 22 of the separator 20b are allowed to directly abut on the outer peripheral frame-like ribs 22 of the other separator 20c. In this case, the frame-like ribs 21 and 22 function as a spacer for forming a predetermined space between these separators. In this case, the frame-like ribs 21, 22 can function so as to make the space between the groove bottom surfaces of the separators 20 (20b and 20c) facing each other via these frame-like ribs. It is to be noted that in this case, when the height of these frame-like ribs 21, 22 is equal to that of the deformation inhibiting region 24 or the other deformation inhibiting region 43, the projections of the superimposed separators 20 (20b, 20c) can be brought into contact with each other to function as the spacer.

INDUSTRIAL APPLICABILITY

According to the present invention, with regard to a separator having a structure where the shapes of projections and recesses are inverted from each other on the front surface and the back surface of each separator, a backup structure suitable for inhibiting the deformation of the separator can be realized.

Therefore, the present invention can broadly be used in thus demanded cell laminate 3 or fuel cell 1.

The invention claimed is:

1. A cell laminate constituted by laminating cells each including a membrane-electrode assembly having an electrolyte membrane and a plate-like separators between which the membrane-electrode assembly is held and in which the shapes of projections and recesses are inverted from each other on the front surface and the back surface of the separator, wherein between adjacent separators constituting the cell, there is formed either a power generation region where the membrane-electrode assembly and a resin-made frame-like member which holds at least a part of the membrane-electrode assembly are inserted, and between the cells, there is formed a refrigerant flow region where the membrane-electrode assembly or the frame-like member is not inserted, a rib-like deformation inhibiting region which inhibits the deformation of the separators is formed of projections provided on portions of the separators which connect manifolds to supply or discharge a reactant gas or a refrigerant to or from cells to the power generation region of the membrane-electrode assembly, or portions of the separators which connect manifolds to supply or discharge a refrigerant to or from between the cells to the refrigerant flow region, the projections protruding on a surface opposite to a surface on which the membrane-electrode assembly is held, and at least a part of the deformation inhibiting region overlaps with the membrane-electrode assembly as viewed from a laminating direction of the separators, whereby a portion of the deformation inhibiting region overlapped with the membrane-electrode assembly increases a close contact degree with respect to the adjacent separators by use of a reaction force generated by the membrane-electrode assembly, at least another part of the deformation inhibiting region extends into the vicinity of a manifold in fluid communication with the refrigerant flow region, recesses formed integrally with the back surfaces of the projections forming the deformation inhibiting region are backed up by an adhesive layer interposed between the recesses and the frame-like member, another deformation inhibiting region which inhibits the deformation of the deformation inhibiting region in the power generation region where the frame-like member is inserted is formed of separator deformation inhibiting projections provided on the frame-like member so as to project toward the recesses, the protrusions provided on the frame-like member have a rigidity higher than that of the adhesive layer to further improve the rigidity of a portion which backs up the back surface of the deformation inhibiting region of the separator, the recesses formed integrally with the back surfaces of the projections forming the deformation inhibiting region are filled with at least one of the projections provided on the frame-like member and the adhesive layer, and the deformation inhibiting regions formed on the separators disposed adjacent to each other across the refrigerant flow region come in contact with each other.

2. The cell laminate according to claim 1, wherein the refrigerant flow region is provided with frame-like ribs which are constituted of projection-like portions provided on the separators so as to have a height equal to that of the projections forming the deformation inhibiting region and which function as a spacer to make a predetermined space between the separators facing each other via the projection-like portions.

3. The cell laminate according to claim 1, wherein the projections provided on the frame-like member are mixed with a member having a strain smaller than that of the frame-like member.

4. A cell laminate constituted by laminating cells each including a membrane-electrode assembly having an electrolyte membrane and plate-like separators between which the membrane-electrode assembly is held and in which the shapes of projections and recesses are inverted from each other on the front surface and the back surface of the separator, wherein between separators constituting the cell, there is formed a power generation region where the membrane-electrode assembly and a resin-made frame-like member which holds at least a part of this membrane-electrode assembly are inserted, and between the cells, there is formed or a refrigerant flow region where the membrane-electrode assembly or the frame-like member is not inserted, a rib-like deformation inhibiting region which inhibits the deformation of the separators is formed of projections provided on portions of the separators which connect manifolds to supply or discharge a reactant gas or a refrigerant to or from the respective cells to the power generation region of the membrane-electrode assembly, or portions of the separators which connect manifolds to supply or discharge a refrigerant to or from between the cells to the refrigerant flow region, the projections protruding on a surface opposite to a surface on which the membrane-electrode assembly is held, at least another part of the deformation inhibiting region extends into the vicinity of a manifold in fluid communication with the refrigerant flow region, at least a part of the deformation inhibiting region overlaps with the membrane-electrode assembly as viewed from a laminating direction of the separators, whereby a portion of the deformation inhibiting region overlapped with the membrane-electrode assembly increases a close contact degree with respect to the adjacent separator by use of a reaction force generated by the membrane-electrode assembly, recesses formed integrally with the back surfaces of the projections forming the deformation inhibiting region are backed up in a state in which the recesses are filled with an adhesive layer interposed between the recesses and the frame-like member, and the deformation inhibiting regions formed on the separators disposed adjacent to each other across the refrigerant flow region come in contact with each other.

5. The cell laminate according to claim 1, wherein the deformation inhibiting region is constituted of a plurality of projection-like ribs continuously formed from the side of the membrane-electrode assembly to the side of the manifolds without any cut.

6. A fuel cell which comprises the cell laminate according to claim 1.

7. The cell laminate according to claim 4, wherein the deformation inhibiting region is constituted of a plurality of projection-like ribs continuously formed from the side of the membrane-electrode assembly to the side of the manifolds without any cut.

8. A fuel cell which comprises the cell laminate according to claim claim 4.

* * * * *